United States Patent [19]

Dunn

[11] Patent Number: 5,696,810
[45] Date of Patent: Dec. 9, 1997

[54] TELEPHONE LINE MONITOR/ALARM

[76] Inventor: Robert G. Dunn, 161 Herring Cove Road, Halifax, Nova Scotia, Canada, B3P 1K8

[21] Appl. No.: 381,216

[22] Filed: Jan. 31, 1995

[30] Foreign Application Priority Data

Oct. 7, 1994 [CA] Canada ................... 2133900

[51] Int. Cl.⁶ ............................ H04M 1/00; H04M 3/08
[52] U.S. Cl. ........................ 379/32; 379/34; 379/7; 379/29; 379/35
[58] Field of Search ............... 379/7, 6, 32, 29, 379/33, 34, 35, 37, 42

[56] References Cited

U.S. PATENT DOCUMENTS

| | | | |
|---|---|---|---|
| 4,634,813 | 1/1987 | Hensley | 379/34 |
| 4,827,498 | 5/1989 | Ross | 379/32 |
| 4,922,515 | 5/1990 | Simpson, Jr. | 379/34 |
| 4,969,179 | 11/1990 | Kanare et al. | 379/33 |
| 5,056,131 | 10/1991 | Kanare et al. | 379/33 |
| 5,062,131 | 10/1991 | Kanare et al. | 379/33 |

*Primary Examiner*—Curtis Kuntz
*Assistant Examiner*—Paul Loomis
*Attorney, Agent, or Firm*—Leonard Bloom

[57] ABSTRACT

This invention is directed to a device for monitoring the integrity of telephone lines and for warning when the lines are inoperative. The device comprises a monitoring unit which continuously senses the voltage across the telephone lines and generates a control signal which assumes a first value when the lines are operational and a second value when the lines are inoperative. An alarm unit generates a warning signal of an audible frequency when the control signal assumes the second value, and is controlled with a switching unit. The switching unit maintains the alarm unit deactivated when the control signal has the first value and activates the alarm unit when the control signal has said second value.

14 Claims, 3 Drawing Sheets

TELEPHONE LINE MONITOR/ALARM

FIELD OF THE INVENTION

The present invention is directed to a telephone line monitor/alarm system and more particularly to a system for detecting interruption of a telephone line.

BACKGROUND OF THE INVENTION

DESCRIPTION OF THE RELATED ART

Most of the prior art telephone line testing devices do not provide continuous monitoring of the telephone lines and are instead intermittent use test devices which require disconnecting of the telephone followed by testing the line. Continuous monitoring is important for the average consumer who does not know when his or her line has become inoperative. In addition, the use of a line monitor/alarm device is a convenient solution for checking telephone line integrity.

The telephone lines may become inoperative due to various reasons. For example, the line may be accidentally broken, shorted, or may be cut during a burglary in order to disconnect an alarm system from a central monitoring station.

Generally, visual, auditory or both visual and auditory warnings are provided by the devices of the prior art. When visual signals are not adequate, an auditory signal may be used. An auditory signal to warn of line failure is preferable over a visual signal as the signalling device is not always in easy view. For example, in a household with only one telephone set, a person may be away from the room with the device for extended periods or may not look at the testing device for extended periods of time.

It is also desirable to have a means for signalling if the telephone lines were cut during a burglary. An auditory warning will warn the house occupant that the lines were cut allowing him or her to take protective measures.

U.S. Pat. No. 5,062,131 (Kanare et al.) discloses a telephone line monitoring apparatus which is used to continuously monitor the telephone line and provide both a visual signal and an auditory signal if the line becomes inoperative. The circuit is designed to be plugged into a conventional telephone jack and monitor the line voltage so that if the line voltage falls below about 6 volts DC or if the line is short circuited or becomes disconnected, the telephone line monitoring apparatus will cause a light emitting diode to flash on and off and further will cause an auditory sounder to emit an audible signal. However, the Kanare et al system employs a substantial number of components, and, more importantly, his system draws power continuously from a supply battery hence requiring replacement of same or recharging at frequent intervals.

SUMMARY OF THE INVENTION

It is an object of the present invention to provide an improved monitor/alarm system for informing of the status of the telephone lines.

It is another object of the present invention to provide a small sized monitor/alarm device which does not consume power from its power supply when the telephone line is operational. The monitoring unit of the device of the present invention is activated only when the lines are interrupted to connect an alarm unit to a power supply.

It is still another object of the present invention to provide a reliable monitor/alarm system which has an overall relatively small component count thus being less complex than the prior an system noted above.

According to a first aspect of the present invention, there is provided a device for monitoring the integrity of a pair of telephone lines and for warning when said lines are inoperative comprising: a monitoring unit for sensing a voltage present across said lines and generating a control signal which assumes a first value when said lines are operational and assumes a second value when said lines are inoperative; an alarm unit for generating a warning signal of an audible frequency when said control signal assumes said second value; a switching unit for maintaining said alarm unit deactivated when said control signal has said first value and for activating said alarm unit when said control signal has said second value; and means for connecting said device to a source of power.

According to another aspect of the invention, there is provided a device for monitoring the integrity of a pair of telephone lines and for warning when said lines are inoperative comprising: a monitoring unit for sensing a voltage present across said lines and generating a control signal which assumes a first value when said lines are operational and assumes a second value when said lines are inoperative; a field effect transistor for receiving said control signal on the gate; a parallel RC circuit connected between the gate and the source of said transistor for maintaining said transistor non-conductive when said control signal has said first value and for turning on said transistor when said control voltage has said second value; a piezoelectric device connected in the drain-source circuit of said field effect transistor for generating a warning signal of an audible frequency when said control signal assumes said second value; and means for connecting said device to a source of power.

Advantageously, the device of the present invention is reliable, simple, and it does not consume any power from its power supply when the telephone lines are operational and the alarm is deactivated.

BRIEF DESCRIPTION OF THE DRAWINGS

A preferred embodiment of the invention will be described in the following with reference to the accompanying drawings in which.

DETAILED DESCRIPTION OF THE PREFERRED EMBODIMENT

By way of introduction, a telephone line typically carries a 50 V voltage in the "on-hook" status to enable the telephone to ring when a number is dialled. In the "off-hook" status, this voltage drops to 6–8 V. In the following, the term "inoperative" is used to define the status of the telephone lines when one or both lines are interrupted or when the lines are shorted.

The device of the preferred embodiment comprises a monitoring unit for detecting when the voltage on the lines becomes 0 V and accordingly turning on an alarm unit. None of the "on-hook" and "off-hook" voltages activate the alarm unit.

Figure 1:
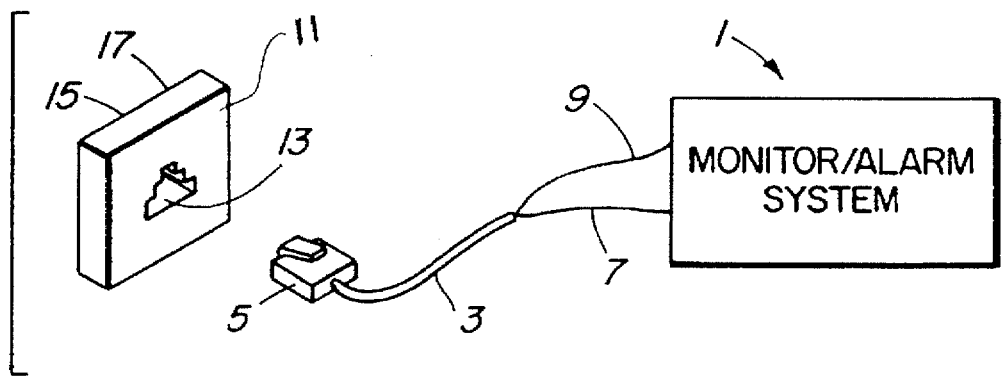
FIG. 1 is a simplified diagram of the telephone line monitor/alarm system of the invention.

The monitor/alarm system, designated by reference numeral 1 on FIG. 1, has a connection cable 3 provided with a telephone plug 5. The cable 3 comprises a wire 7 and a wire 9. The telephone plug 5 can be inserted into recess 13 of the wall plug 11 to connect wires 7 and 9 to tip and ring wires 15 and 17 of the telephone network. Either of the wires 7 and 9 may be connected to the wire tip and ring wire 15 or 17.

Figure 2A:
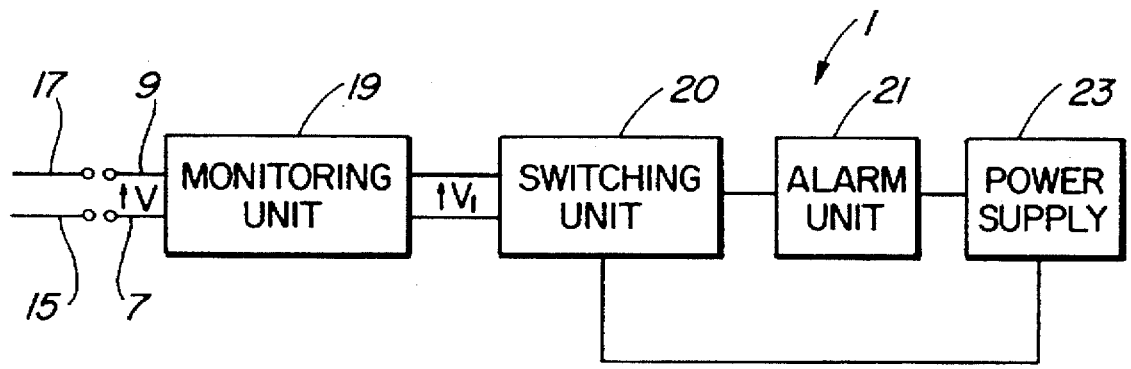
FIG. 2A shows a block diagram of the telephone line monitor/alarm system of the invention.

FIG. 2A shows a block diagram of the telephone line monitor/alarm system in accordance with the invention. Monitoring unit 19 is connected with wires 7 and 9 in parallel across the telephone pair 15, 17. When voltage V between these wires drops to 0 volts, the monitoring unit 19 operates switching unit 20 to connect power supply 23 to the alarm unit 21. The alarm unit 21 is activated and issues a warning to show that lines 15, 17 are interrupted or shorted. Preferably, the power supply 23 is a battery which is inserted into a housing of the device, as is better illustrated on FIG. 3. Alarm unit 21 is preferably a pulsing piezoelectric annunciator, as for example a piezoelectric buzzer which may be purchased from Radio Shack (Canadian) stores as part #273-066. Other types of annunciators may be used as alarm unit 21.

Figure 2B:
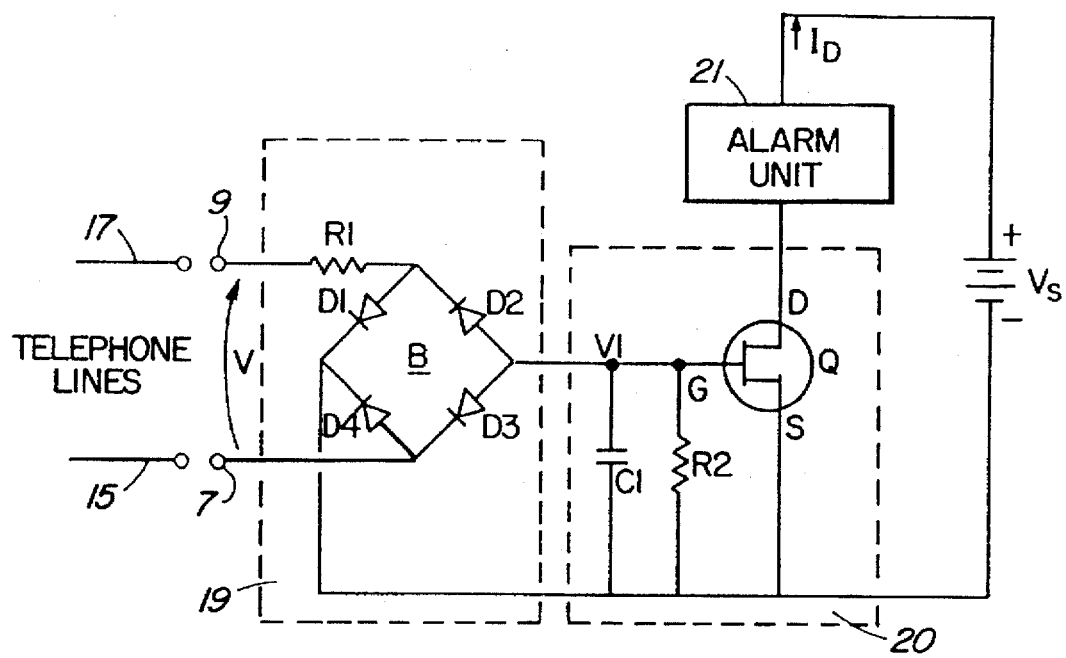
FIG. 2B illustrates the electrical schematic of the monitor/alarm system.

FIG. 2B is an electrical schematic of the monitor/alarm system. The monitoring unit 19 comprises the circuits within the area delimited by the dashed lines. When voltage V is present between the lines 15 and 17, this voltage appears between terminals 7 and 9 of the monitoring unit 19. Diode bridge B transfers a negative voltage V1 to the gate G of a field effect transistor Q. Voltage V1 is always negative in the embodiment of FIG. 2B irrespective of the way or sense in which the wires 7 and 9 are connected to the incoming telephone lines. Thus, diodes D1 and D3 conduct when the voltage on wire 9 is positive and the voltage on wire 7 is negative. In the case where wire 9 receives a negative input voltage and wire 7 receives a positive voltage, diodes D2 and D4 conduct. The values of R1 and R2 are selected to obtain the desired voltage V1 across resistor R2. Capacitor C1 charges to voltage V1. Resistor R2 is connected between the gate G and the source S of an n-channel FET referred to as Q and which performs the switching function referred to hereafter. Voltage V1 across C1 and R2 is selected so as to maintain transistor Q in a nonconductive state. The alarm unit 21 is consequently not activated as no current flows in the drain-source circuit. When the voltage on input lines 7, 9 drops to 0 volts, the gate voltage V1 decreases towards 0 volts and when it is under the cutoff voltage of switch Q, the switch starts conducting. A current $I_D$ flows in the drain-source circuit and the alarm 21 is activated. It is apparent that since $I_D$ only flows when the lines 15, 17 are interrupted or shorted, the life of battery 23 can be substantially extended with the circuit of FIG. 2B. Capacitor C1 connected across resistor R2 is used to prevent variation of voltage V1 when Q does not conduct. The purpose of capacitor C1 is to bypass interfering signals, such as those radiated by high power radio frequency sources, or the mains frequencies from the high impedance gate circuit of Q, thereby preventing accidental turn on of the alarm. C1 discharges on resistor R2 when V1 becomes 0 volts.

Figure 3:
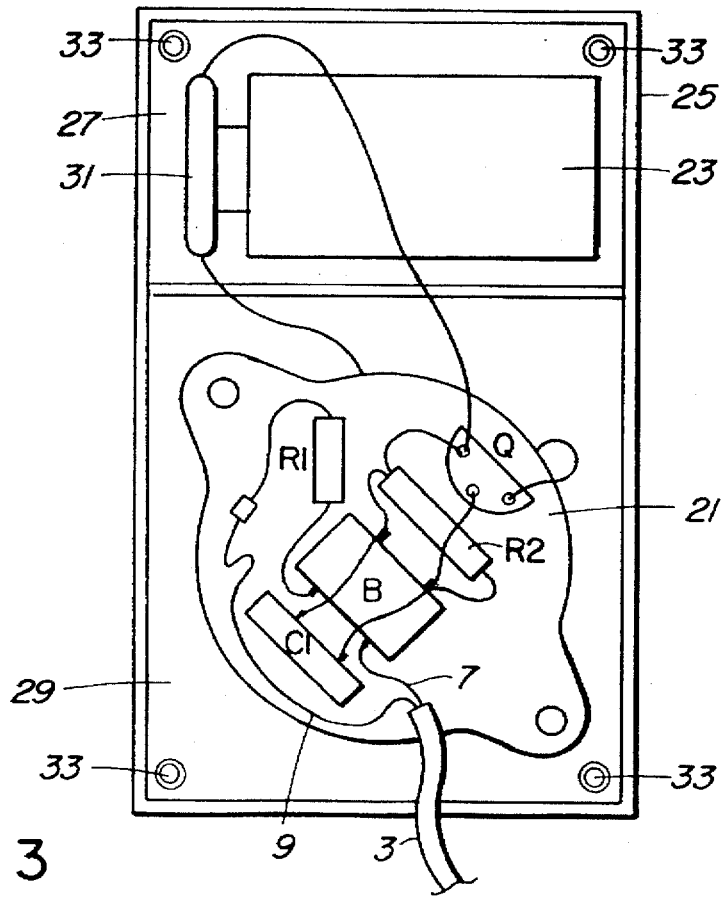
FIG. 3 shows a top view of the monitor/alarm system arranged in a housing (cover removed)

A simple method of manufacturing the device is shown in connection to FIG. 3. A housing 25 is divided into two compartments, a battery compartment 27 and a component compartment 29. Alarm unit 21 is placed first in compartment 29 and the components Q, R1, R2, C1 and diode bridge B are glued to unit 21. The connections between the components are made in the next step to obtain the compact structure illustrated in FIG. 3. Compartment 29 is then filled with epoxy so that the components and the connections therebetween are immobilized. Then the battery 23 is placed in connector 31 in compartment 27 and a cover (not shown) is attached to the housing with screws threaded into holes 33.

The telephone line monitor/alarm system of the present invention is easy to install by inserting the plug 5 into outlet 13 of the wall plug 11. Preferably, the battery 23 is placed in compartment 27 of housing 25 after the device has been plugged. If the battery is connected before the device is plugged, it will be emitting an audio pulsating tone because V1 (see FIG. 2) is 0 volts, so that $I_D$ flows in the source-drain circuit. However, as soon as the device is plugged and the telephone line is operational, a current appears in the gate-source circuit, flowing from the gate to the source through R2. When the cut-off voltage is reached on the gate, the source-drain circuit is open and the alarm interrupted. The ratio of resistances R1:R2 can vary, depending upon the specifications of the FET Q. The total resistance of R1 and R2 should be in the order of tens of mwgohms, so as to draw only about 5 microampers from the telephone circuit.

The alarm unit may have alternative embodiments. FIG. 3 illustrates an embodiment where the alarm unit is a piezoelectric device. A piezoelectric device is a thin disc of poled ceramic, bonded to a slightly larger disc of thin metal. By the proper design and mounting of this assembly, it can be made to form part of a Helmholtz resonator. This greatly enhances the audible output of the device. This is well known to those skilled in the art and a device such as this could be the frequency determining component of a single transistor oscillator.

Figure 4:
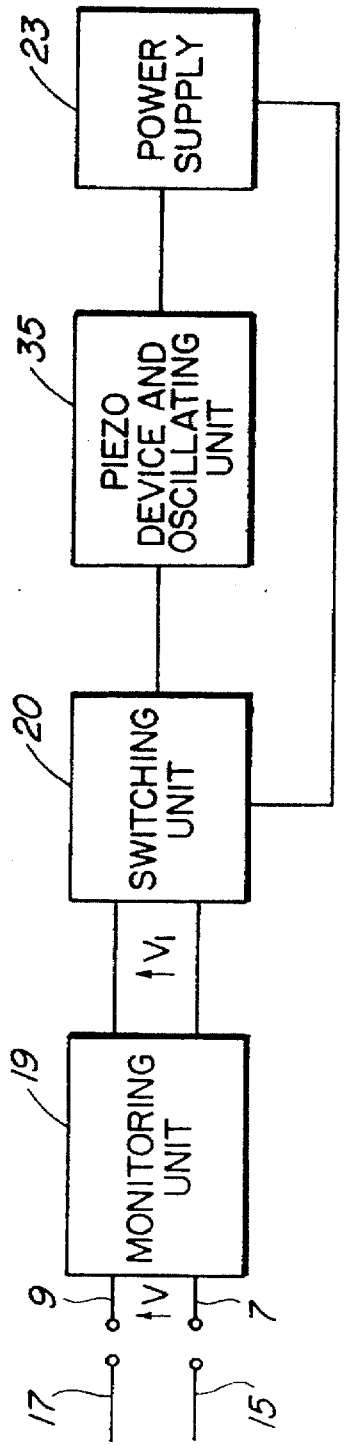
FIG. 4 shows a block diagram of the telephone line monitor/alarm system according to another embodiment of the invention.

FIG. 4 illustrates the block diagram of such an alternative embodiment, where the alarm unit 21 is a piezoelectric device and oscillator unit 35. Unit 35 may be an integral part of the equipment to be monitored. With the device of FIG. 4, the sound of the alarm would not be pulsating, but a continuous tone.

Figure 5:
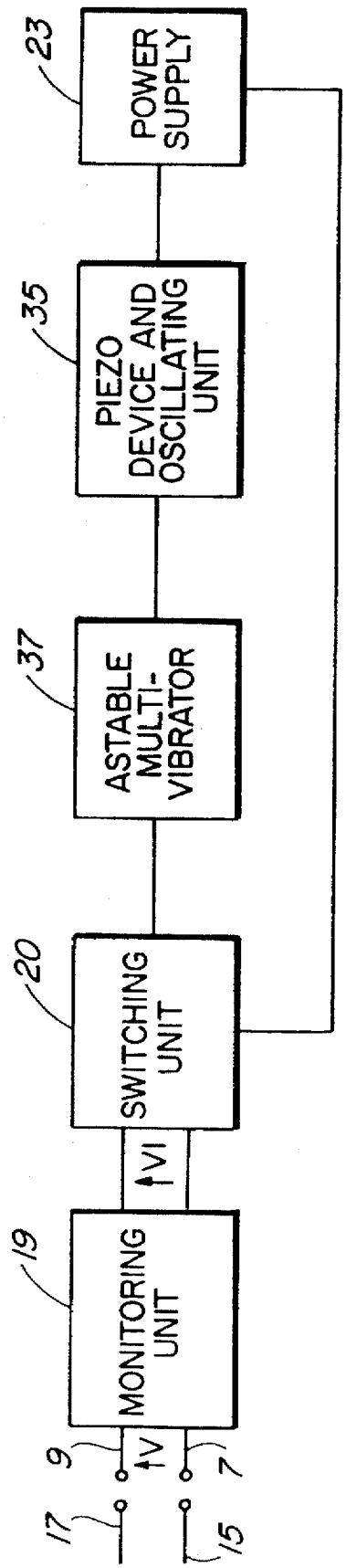
FIG. 5 shows a block diagram of the telephone line monitor/alarm system according to still another embodiment of the invention.

Likewise, by adding an astable multivibrator 37, as illustrated in the embodiment of FIG. 5, the device will emit a pulsating tone.

The device of the present invention my be used in telephones, modems, computers and any other equipment which is connected to a telephone network, providing for a reliable, simple, inexpensive and low power consuming equipment for acknowledging when the telephone lines are non-operational.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

I claim:

1. A device for monitoring the integrity of a pair of telephone lines and for warning when said lines are inoperative comprising:

a monitoring unit for sensing a voltage present across said lines and generating a control signal which assumes a first value when said lines are operational and assumes a second value when said lines are inoperative;

an alarm unit for generating a warning signal when said control signal assumes said second value;

a switching unit for maintaining said alarm unit deactivated when said control signal has said first value and for activating said alarm unit when said control signal has said second value, said switching unit comprising a field effect transistor for receiving said control signal on the gate and a parallel RC circuit connected between the gate and the source of said transistor for maintaining said transistor non-conductive when said control signal has said first value and for turning on said transistor when said control signal has said second value; and means for connecting said device to a source of power.

2. A device as claimed in claim 1, wherein said monitoring unit comprises a diode bridge having input terminals for connection across said telephone lines and output terminals for obtaining said control signal with a pre-established polarity, irrespective of the way the input terminals are connected across said lines.

3. A device as claimed in claim 1, wherein said alarm unit is a piezoelectric device connected in series with said switching unit.

4. A device as claimed in claim 1, wherein said alarm unit comprises an oscillator for generating said warning signal, and a piezoelectric device connected to said oscillator for determining the frequency of said warning signal.

5. A device as claimed in claim 1, further comprising an astable multivibrator connected between said switching unit and said oscillator for modifying the state of said warning signal.

6. A device as claimed in claim 1, wherein said alarm unit is connected in the drain source circuit of said transistor.

7. A device as claimed in claim 2, wherein said transistor is an n-channel FET and the polarity of said control signal is negative.

8. A device as claimed in claim 1, further comprising a housing provided with a first compartment for protecting said monitoring unit, said alarm unit and said switching unit.

9. A device for monitoring the integrity of a pair of telephone lines and for warning when said lines are inoperative comprising:

a monitoring unit for sensing a voltage present across said lines and generating a control signal which assumes a first value when said lines are operational and assumes a second value when said lines are inoperative;

a field effect transistor for receiving said control signal on the gate;

a parallel RC circuit connected between the gate and the source of said transistor for maintaining said transistor non-conductive when said control signal has said first value and for turning on said transistor when said control voltage has said second value;

a piezoelectric device connected in the drain-source circuit of said field effect transistor for generating a warning signal of an audible frequency when said control signal assumes said second value; and means for connecting said device to a source of power.

10. A device for monitoring the integrity of a pair of telephone lines and for warning when said lines are inoperative comprising:

a diode bridge having input terminals for connection across said telephone lines, and output terminals for obtaining a control signal with a pre-established polarity, irrespective of the way the input terminals are connected across said lines;

a field effect transistor for receiving said control signal on the gate;

a parallel RC circuit connected between the gate and the source of said transistor for maintaining said transistor non-conductive when said control signal has said first value and for turning on said transistor when said control voltage has said second value;

a piezoelectric device connected in the drain-source circuit of said field effect transistor for generating a warning signal of an audible frequency when said control signal assumes said second value; and means for connecting said device to a source of power.

11. A device as claimed in claim 10, further comprising an astable multivibrator connected between said switching unit and said oscillator for modifying the state of said warning signal.

12. A device as claimed in claim 10, further comprising a housing provided with a first compartment for protecting said diode bridge, said piezoelectric device, said field effect transistor and said parallel RC circuit.

13. A device as claimed in claim 12, wherein said housing further comprises a second compartment for receiving said means for connecting and said source of power.

14. A device as claimed in claim 12, wherein said diode bridge, said field effect transistor and said parallel RC circuit are glued on said piezoelectric device and said first compartment is filled with an epoxy resin.

* * * * *